US008689292B2

(12) United States Patent
Williams et al.

(10) Patent No.: US 8,689,292 B2
(45) Date of Patent: Apr. 1, 2014

(54) METHOD AND SYSTEMS FOR DYNAMICALLY PROVIDING COMMUNITIES OF INTEREST ON AN END USER WORKSTATION

(75) Inventors: Timothy C. Williams, Sterling, VA (US); Randall Breeden, Gaithersburg, MD (US); Richard Holtslander, Bealeton, VA (US); Edward Browdy, Ashburn, VA (US)

(73) Assignee: API Technologies Corp., Sterling, VA (US)

( * ) Notice: Subject to any disclaimer, the term of this patent is extended or adjusted under 35 U.S.C. 154(b) by 882 days.

(21) Appl. No.: 12/106,917

(22) Filed: Apr. 21, 2008

(65) Prior Publication Data

US 2009/0328170 A1    Dec. 31, 2009

(51) Int. Cl.
*H04L 29/06* (2006.01)
(52) U.S. Cl.
USPC ............... 726/4; 726/2; 726/3; 726/7; 726/8; 726/15; 718/1; 713/150; 713/164; 713/168; 713/170; 713/176; 717/120; 717/121; 717/168; 717/169; 717/171; 717/172
(58) Field of Classification Search
USPC ......... 726/2–4, 7, 8, 15; 718/1; 713/150, 164, 713/168, 170, 176; 717/120, 121, 168, 169, 717/171, 172
See application file for complete search history.

(56) References Cited

U.S. PATENT DOCUMENTS

| 8,135,825 | B2 * | 3/2012 | Wendling | 709/224 |
|---|---|---|---|---|
| 2003/0126137 | A1 | 7/2003 | McFadden | |
| 2006/0155735 | A1 * | 7/2006 | Traut et al. | 707/101 |
| 2006/0277542 | A1 | 12/2006 | Wipfel | |
| 2007/0168657 | A1 * | 7/2007 | Carro | 713/156 |
| 2007/0185875 | A1 * | 8/2007 | Chang et al. | 707/9 |
| 2007/0192329 | A1 * | 8/2007 | Croft et al. | 707/10 |
| 2009/0077659 | A1 * | 3/2009 | Segawa | 726/21 |
| 2009/0260007 | A1 * | 10/2009 | Beaty et al. | 718/1 |

OTHER PUBLICATIONS

PCT: Notification of Transmittal of the International Search Report and the Written Opinion of the International Searching Authority, or the Declaration, issued in PCT/US2009/041272, mailed Jun. 11, 2009.

* cited by examiner

*Primary Examiner* — Brandon Hoffman
*Assistant Examiner* — Hee Song
(74) *Attorney, Agent, or Firm* — RatnerPrestia

(57) ABSTRACT

A method and system provide dynamic communities of interest on an end user workstation utilizing commercial off the shelf products, with central management and the ability for a users to log on only once (also known as "single sign on" or "SSO"). The software images that make up the virtual machine can be patched and updated with other required changes from a central storage area where the image can be administratively updated just once. A digital signature can be applied to the software images to ensure authenticity and integrity, along with determining whether a software image is up to date.

23 Claims, 12 Drawing Sheets

METHOD AND SYSTEMS FOR DYNAMICALLY PROVIDING COMMUNITIES OF INTEREST ON AN END USER WORKSTATION

BACKGROUND

1. Field

The present invention relates generally to providing access control to multiple communities of interest, and more specifically to dynamically control access to multiple communities of interest on a single user workstation.

2. Background

Systems exist that contain an end user workstation computing architecture using commercial off the shelf ("COTS") components to enable that end user workstation to meet varying levels of information assurance requirements. Such systems utilize typical COTS hardware and software that can be coupled with a host operating system, virtual machine monitor, virtual network hubs, network encryptors, and filtering routers to allow multiple machine environments to run simultaneously and to access multiple networks from the same physical machine. One goal of such systems is to remove the security functionality from the control of the operating system and applications of the end user workstation. In doing so, security functions are layered within the systems and are isolated from user operating systems and application software. Similarly, protection from rudimentary network attacks is provided by router technology. Additionally, various processing instantiations have been incorporated to operate a user workstation and provide increased assurance levels, including through techniques that can provide failure detection.

Certain drawbacks, however, exist in such systems. Typically, an end user workstation implementing such technology contains static domains. A static domain means a network domain with which communication cannot occur unless the client computer is preloaded with the necessary software and credentials, and the software and credentials are not easily changed (added to or removed from) to reflect mission need. As a result, if access to a domain is needed and the proper client partition for that domain does not exist on the end user workstation, the user cannot use that platform. In addition, the static nature of the client partitions requires that each partition must be separately and individually updated. Furthermore, such systems have a local login process that requires all users to have an account on all machines that they expect to use and the communications between the client running on the end user workstation and the associated session server are not protected. On the server side, the session server represents an expensive single point of failure if it experiences a problem or is compromised. Additionally, each domain requires a separate login by the end user workstation.

Additional drawbacks exist with such systems. For example, static domains continue to exist on end user workstations, each partition still needs to be separately and individually updated, and each domain requires a separate login by the user of end user workstation. Generally, as evidenced by current systems used to deploy multi domain workstations (including, for example, CMWs and NetTop systems), management of such individually configured systems does not scale and such systems do not provide the dynamics necessary for a changing environment.

Also, current federated identification and authentication (I&A) systems that are used to provide a single sign on (SSO) capability require that the consumer and producers of the authentication token be able to communicate to validate the generated temporal credentials. In numerous deployments such token-based mechanisms will not operate properly, including, for example, a coalition environment (which could involve multiple nations or multiple armed services) or other similar situations. In these deployments the domains are prohibited by policy from inter communication (since they store highly sensitive information) to ensure that the systems in the domains can not be attacked using the communications channel for the authentication mechanism required for the validation.

Additionally, although current virtual machine based technology provides a mechanism to emulate the operation of multiple different types of computers on a single computer workstation, in a heterogeneous system (e.g., a coalition environment), this capability does not provide acceptable methods for keeping the images that make up the virtual machine patched and updated with other required changes. In certain systems, a virtual machine image can be booted from a central storage area where the image can be administratively updated once. This image, however, then must be distributed to the members of the environment. Such a technique does not meet the needs of various environments where such distribution would be unworkable (e.g., in a battlefield or other coalition environment, or where a platform has limited bandwidth).

Consequently, a need exists in the art for a system that dynamically provides communities of interest on a COTS platform with central management and the ability for a user to log on only once (also known as "single sign on" or "SSO"). Such a system would be useful in numerous contexts, including in distressed communications environments with low bandwidth (e.g., in a battlefield context).

SUMMARY

Aspects of the current invention address the above stated needs with a system that enables a single user workstation to communicate with multiple domains in a dynamic fashion. In an embodiment, a system for dynamically providing multiple communities of interest on an end user workstation is provided, including a processor system, storage for multiple cached virtual machine appliances and a virtual machine environment. The virtual machine environment could comprise the Linux operating system, which could also contain virtual machine appliances and a single sign on capability across multiple domains. Such a single sign on capability, in an exemplary embodiment, could be contained within a small piece of authentication software such as an agent deployed on the end user workstation.

In an embodiment, the virtual machine appliances can be cached and encrypted, allowing them to be deployed in tactical or other dynamic environments where connectivity can be problematic. Further, the virtual machine appliances can be dynamically configured based on policy data, such as the identity of the end user, the role of the end user, and the type of information on the end user workstation in use by the end user. The policy data can also be maintained on a centralized server.

In another embodiment, a signature can be calculated on an image of a virtual machine and that signature can be associated with that virtual machine image. The virtual machine image and signature can be stored on a domain server, which can also check requests for updating of the virtual machine image. The virtual machine images can be distributed to authorized users.

In a further embodiment, a determination can be made if a local image of a virtual machine is current and, if not, an updated version of the virtual machine image can be received.

The signature on the virtual machine image can be checked and the virtual machine image can then be stored.

Additional embodiments of the software may relate to how the cached virtual image machine is stored, how policy data is used to determine a configuration, what types of signatures can be used in validating an image of a virtual machine, and how authentication of a user occurs. In an embodiment, for example, an end user can be authenticated for access to multiple communities of interest by determining the authentication data required for the user to access the desired communities of interest, receiving authentication data from the user, creating a validation request that can then be transmitted to an authentication management server, providing access by the authentication management server to authentication information from the one or more communities of interest, and receiving a response from an authentication management server that allows a determination to be made if the user is a valid user.

In additional embodiments, an end user can be authenticated by determining if biometric data from the user is needed and then receiving biometric data from the user. Further, end user authentication for access to multiple communities of interest can include performing a local login check, receiving a role indication from a user, and accessing a multi-domain Lightweight Directory Access Protocol (LDAP) server.

DETAILED DESCRIPTION

A domain refers to a group of computers, often centrally-managed, on a communications or computer network that share common operations or resources, including, for example, a common directory or common storage locations.

A community of interest (referred to herein as a COI) can be any group of users sharing a common feature, function, or characteristic. For example, an agency within a government could be a community of interest. Similarly, a special operations military unit could be a community of interest. Commercial communities of interest could include but are not limited to multi-corporation bid and proposal teams, a non-profit, or an industry group. Such communities of interest often have communication needs that require security and a need-to-share environment.

A dynamic community of interest or dynamic COI refers to a COI whose information processing requirements must be met without the need for significant set up or configuration of the information technology that it employs. For example, a member of a dynamic COI might need information contained within a particular resource or domain for which that member does not have access. In a dynamic community of interest, such a member would be provided access to the required information/resource by a policy change at the time such a need arises and be able to immediately access the required resource or domain. Additionally, when the need for the information/resource has passed, access to the information/resource can be revoked by a reversal of the policy change.

The word "exemplary" is used exclusively herein to mean "serving as an example, instance, or illustration." Any embodiment described herein as "exemplary" is not necessarily to be construed as preferred or advantageous over other embodiments.

Figure 1:
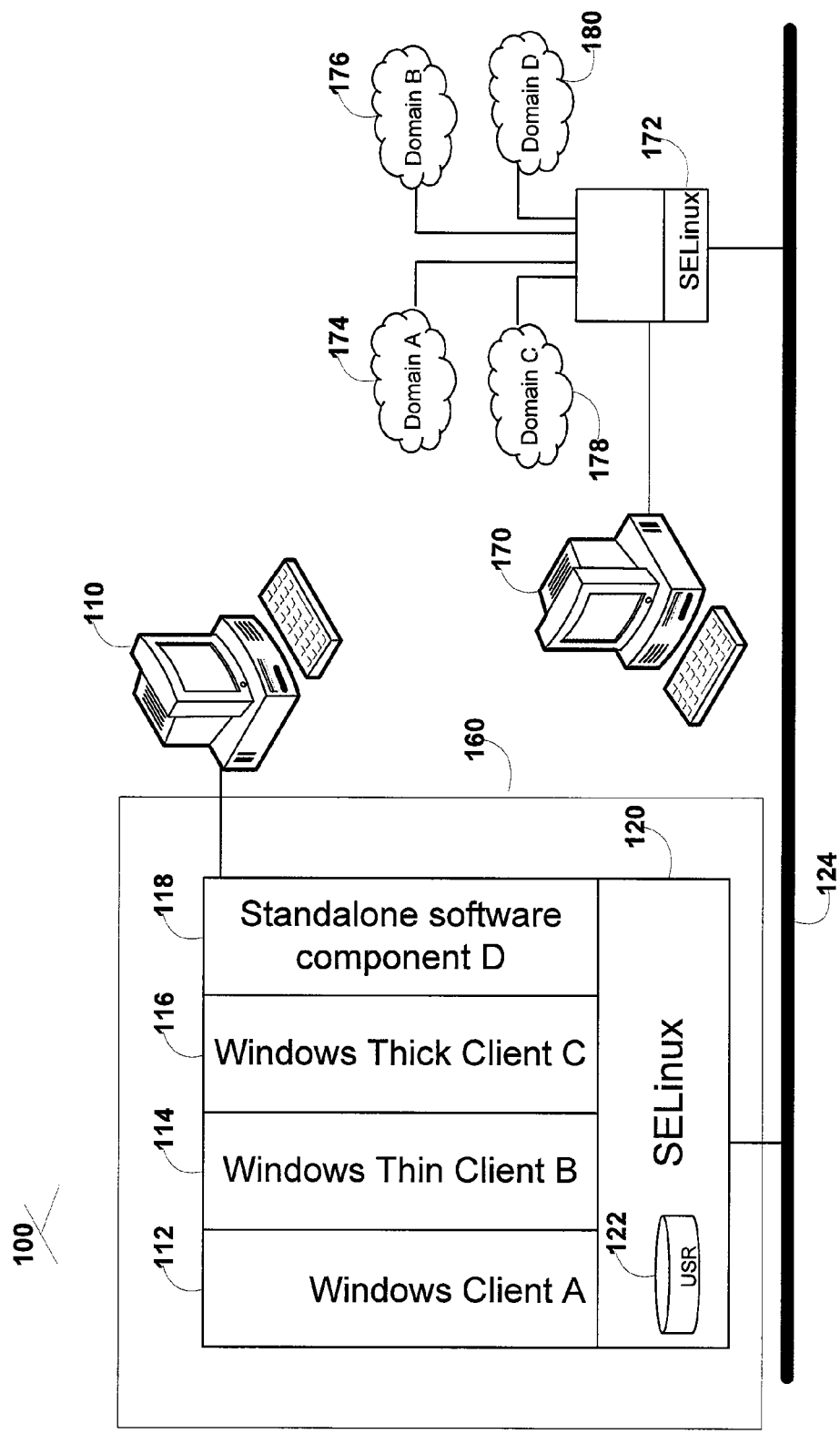
FIG. 1 is a network block diagram of a system that provides information processing capabilities to a community of interest.

FIG. 1 illustrates a system 100 that meets varying levels of information assurance requirements on a single end user workstation. The system 100 contains end user workstation 110 and session server 170. End user workstation 110 contains Windows client A 112, along with three Windows thin clients, thin client B 114, thick client C 116, and standalone software component D 118. End user workstation 110 has installed on it an SELinux operating system 120, which has access to a local user database 122 that can be used for purposes of login. End user workstation 110 communicates over communications link 124 with session server 170, which also has installed on it an SELinux operating system 172. Session server 170 allows communication between the clients resident on end user workstation 110 and the associated domains accessible via session server 170 (e.g., Windows client A 112 can access domain A 174, Windows client B 114 can access domain B 176, Windows client C 116 can access domain C 178, and software component D 118 can access domain D 180). An example of the architecture illustrated in FIG. 1 is the NETTOP architecture, as specified by the National Security Agency (NSA).

Figure 2:
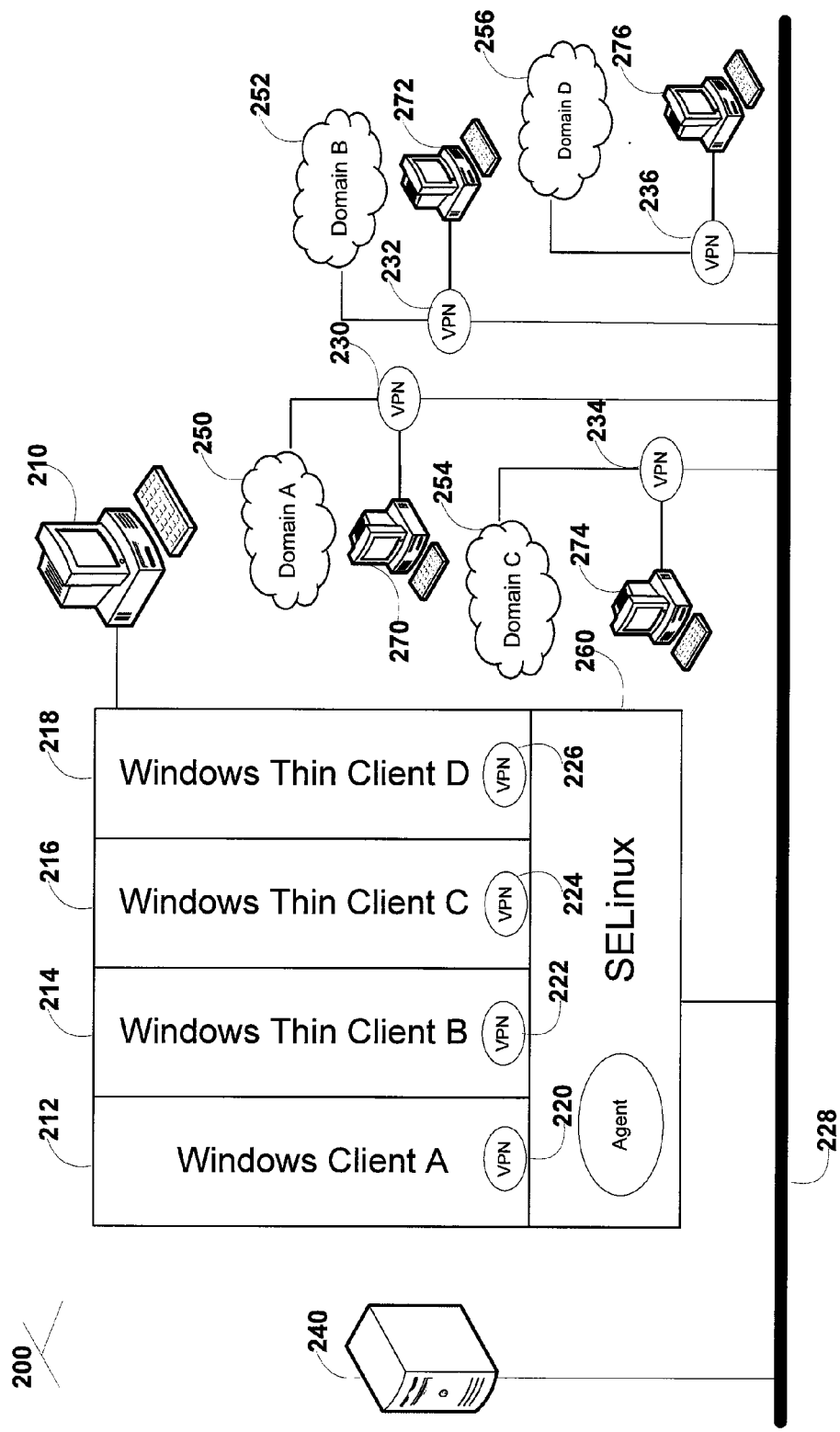
FIG. 2 is a network block diagram of another system that provides information processing capabilities to a community of interest.

FIG. 2 illustrates another system that provides varying levels of information assurance requirements on a single end user workstation. The system 200 includes end user workstation 210. Similar to the system shown in FIG. 1, end user workstation 210 contains a virtual machine environment 260, which further contains Windows client A 212 corresponding to domain A 250, along with three Windows thin clients 214, 216, and 218 corresponding, respectively, to domain B 252, domain C 254, and domain D 256. In contrast to the system of FIG. 1, however, system 200 provides centralized login via an authentication management server 240. This alleviates the need for the user workstation to contain a database of login information for each user who is to utilize the workstation and the administrative overhead associated with such administration.

Furthermore, unlike the single session server in system 100, system 200 contains multiple session servers 270, 272, 274, and 276. Each session server provides access by the end user to, respectively, domain A 250, domain B 252, domain C 254, and domain D 256. In addition, software-based thin client virtual private networks (VPNs) 220, 222, 224 and 226 on end user workstation 210 communicate with remote VPNs 230, 232, 234, and 236 over communications link 228. The approach of communicating with separate session servers using VPNs eliminates two problems—(a) the single point of failure that can exist with a session server that services numerous domains and (b) unencrypted communications between the end user workstation and the corresponding domains, both of which are shortcomings in the system described in FIG. 1. An example of the architecture illustrated in FIG. 2 is the High Assurance Platform ("HAP") architecture, also as specified by the National Security Agency (NSA).

Figure 3:
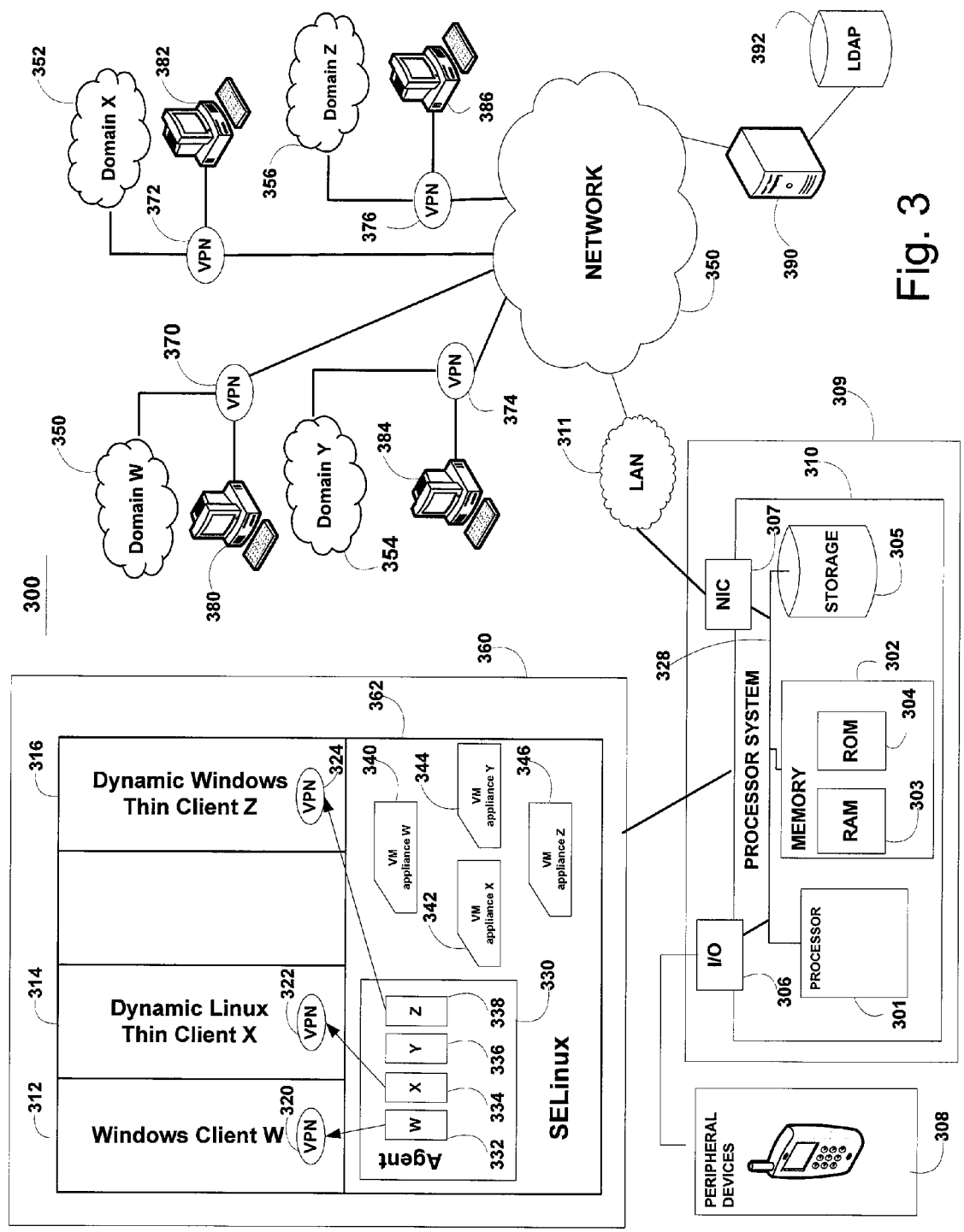
FIG. 3 is a network block diagram of an example of a system that provides dynamic communities of interest on an end user workstation.

FIG. 3 depicts a functional block diagram of an exemplary system according to the present invention that can provide one or more dynamic communities of interest to an end user. System 300 includes processor system 310 within an end user workstation 309. Processor system 310 further contains a virtual machine environment 360. As used herein, a virtual machine means a collection of software and hardware resources that provides independence between the software in the system (including both applications and the operating system) and the underlying hardware. Accordingly, a virtual machine environment refers to the collection of software and associated hardware that allow a virtual machine to execute.

System 300 also contains multiple session servers 380, 382, 384, and 386. Each session server can provide access by the end user via processor system 310 to, respectively, domain W 350, domain X 352, domain Y 354, and domain Z 356. In addition, VPNs 320, 322, and 324 on processor system 310 can communicate with remote VPNs 370, 372, and 376 over communications link 328, which is connected to network 350 through network interface card (NIC) 307 connected to local area network 311. These VPN components provide communications security and data separation by encryption and also include firewall access control functionality. Note that in this example, a dynamic Windows thin client has not been loaded for domain Y. As discussed above in connection with system 200, communicating with separate session servers using VPNs eliminates the single point of failure that can exist with a session server that services numerous domains and unencrypted communications between the end user workstation and the corresponding domains.

In an alternative embodiment, but not shown in FIG. 3, each of the VPNs 320, 322, and 324 could exist separately from the processing instantiations 312, 314, and 316, including within operating system environment 362. In such an instance, the access control functionality provided by the internal firewall(s) coupled with the security provided by VPNs 320, 322, and 324 can be viewed as virtual network security devices that can alternatively be implemented by the VPN encryption process contained within the processing instantiation and the firewall functionality contained within the operating system environment as a separate processing instantiation(s).

As used herein, a processing instantiation could include any system that can be loaded over a network and instantiated on the client (i.e., any system that does not store data locally). This could include by way of example and not limitation any type of service or component, such as a thick client, thin client, service, or standalone software component. Further, a thin client can be any self-contained software package in a client-server architecture that executes on a client machine and depends on a centralized server for some of its processing activities. One type of thin client could include a virtual appliance. A virtual appliance can include any pre-installed and pre-configured applications that have been combined (from a delivery perspective) with an operating system into a completely standalone piece of software.

A central manager user interface can be provided that will allow a security administrator to define one or more roles or configurations that will be selectable by the end users. A role can be a textual description of the function or position that an end user can take on, along with any type or combination of behaviors, rights, or privileges that a person may exercise as a result of holding some position or being granted some permission. A configuration can be any type of grouping of functional units related to an end user workstation, user, or resources where the grouping is done according to the characteristics of the functional units and the role of the end user. The roles and configurations being requested can be checked against the requesting users and the associated end user workstation to be used in order to determine what virtual machines will be instantiated on the end user workstation. The user can authenticate to the system using a predefined method, including by way of example only and not limitation, smart card, ID/password combination, biometric, etc., and can then indicate the desired role or configuration (or combination thereof) that the user desires to instantiate on the end user workstation. The requested information is sent to the central manager where it is checked against the policy and if appropriate, authentication data to connect to the appropriate domains are electronically loaded into the client computer. This data is then utilized to open a secure channel between the client computer and the VPN protecting the appropriate domains. In various embodiments, the VPN could be protected by either the well known secure sockets layer (SSL) or Internet Protocol Security (IPSEC) protocols. Once the secure channel is established, the system will then log the user into the appropriate authentication servers in the domain based on the credentials provided by the central manager.

The various elements in FIG. 3 are shown in a network-computing wherein a NIC 307 within processor system 310 is interconnected with a network 350 via LAN 311. It will be appreciated that the elements shown in FIG. 3 are examples of components that can be included in such a processor system 310 and/or devices that can be in communication with a processor system 310, and that elements can be removed or additional elements can be added depending upon the desired functionality of such a system. For example, processor system 310 can function independently of a network 350, or can include more or fewer components than illustrated in FIG. 3.

Processor system 310 illustrated in FIG. 3 can be, for example, a commercially available personal computer (PC), a workstation, a network appliance, a portable electronic device, or a less-complex computing or processing device (e.g., a device that is dedicated to performing one or more specific tasks or other processor-based), or any other device capable of communicating via a network 350. Although each component of processor system 310 is shown as a single component in FIG. 3, processor system 310 can include multiple numbers of any components shown in FIG. 3. Additionally, multiple components of processor system 310 can be combined as a single component, where desired.

Processor system 310 includes a processor 301, which can be a commercially available microprocessor capable of performing general processing operations. For example, processor 301 can be selected from the Pentium family of central processing units (CPUs) available from Intel Corp. of Santa Clara, Calif., or other similar processors. Alternatively, processor 301 can be an application-specific integrated circuit (ASIC), or a combination of ASICs, designed to achieve one or more specific functions, or enable one or more specific devices or applications. In yet another alternative, processor 301 can be an analog or digital circuit, or a combination of multiple circuits.

Processor 301 can optionally include one or more individual sub-processors or coprocessors. For example, processor 301 can include a graphics coprocessor that is capable of rendering graphics, a math coprocessor that is capable of efficiently performing mathematical calculations, a controller that is capable of controlling one or more devices, a sensor interface that is capable of receiving sensory input from one or more sensing devices, and so forth.

Processor system 310 can also include a memory component 302. As shown in FIG. 3, memory component 302 can include one or more types of memory. For example, memory component 302 can include a read-only memory (ROM) component 304 and a random-access memory (RAM) component 303. Memory component 302 can also include other types of memory not illustrated in FIG. 1 that are suitable for storing data in a form retrievable by processor 301, and are capable of storing data written by processor 301. For example, electronically programmable read only memory (EPROM), erasable electrically programmable read only memory (EEPROM), flash memory, as well as other suitable forms of memory can be included as part of memory component 302. Processor 301 can store data in memory component 302 or retrieve data previously stored in memory component 302. Furthermore, Windows Client W 312, dynamic Linux thin client X 314, dynamic Windows thick client Z 316, and SELinux operating system 362 can each be loaded into memory component 302 and executed by processor 301 in processor system 310. More generally, any processing instantiation could be loaded into memory component 302.

Processor system 310 can also include a storage component 305, which can be one or more of a variety of different types of storage devices. For example, the storage component 305 can be a device similar to memory component 302 (e.g., EPROM, EEPROM, flash memory, etc.). Additionally, or alternatively, the storage component 305 can be a magnetic storage device, such as a disk drive, a hard-disk drive, compact-disk (CD) drive, database component, or the like. In an embodiment, storage component 305 can contain VM appliances 340-346. In such an instance, VM appliances 340-346 would be cached. In another embodiment (described in further detail below), VM appliances 340-346 could be stored externally from virtual machine environment 360.

The various components of processor system 310 can communicate with one another via a bus 328, which is capable of carrying instructions from processor 301 to other components, and which is capable of carrying data between the various components of processor system 310. Data retrieved from or written to memory component 302 and/or the storage component 305 can also be communicated via the bus 328.

By way of the I/O component 306 processor system 310 can communicate with devices external to processor system 310, such as peripheral devices 308 that are local to processor system 310. In an embodiment, one peripheral device among peripheral devices 308 could be an access device that permits a user to authenticate that user to the system using credentials that could be verified via authentication management server 390.

Other peripheral devices 308 with which processor system 310 can communicate via the I/O component 306 can include a communications component, processor, a memory component, a printer, a scanner, a storage component (e.g., an external disk drive, database, etc.), or any other device desirable to be connected to processor system 310. Processor system 310 can also communicate with networks that are remote to processor system 310 (e.g., the network 350) via NIC 307.

Processor system 310 contains several features that enable multiple dynamic communities of interest. First, processor system 310 contains Windows client 312, dynamic Linux thin client X 314, and dynamic Windows thick client Z 316. Each of these clients can be instantiated via a cached version of the client stored as a virtual machine (VM) appliance in local storage (such as storage component 305) of processor system 310. In particular, VM appliance W 340 can contain the image of Windows client W 312. Similarly, VM appliance X 342 can contain the image of dynamic Linux thin client X 314 and VM appliance Z 346 can contain the image of dynamic Windows thick client Z 316.

Storing local images of the thin clients as signed and cached VM appliances provides several advantages. First, this approach reduces cost by requiring less maintenance and permitting background updates to the VM appliances. In an embodiment, updates to the system and the ability to boot the system in an operationally timely manner can occur via cached signature-based versions of each VM appliance images 340-346 on processor system 310. Specifically, when the user logs into processor system 310, a central policy manager within authentication management server 390 can cause processor system 310 to load a set of virtual machines from the cached versions of VM appliances 340-346. Processor system 310 can check the local signature of each cached image and if that signature check succeeds, then the processor system 310 can check the remote signature with the signature of that image stored on the applicable data store for each domain (e.g., remote storage contained within or accessible by session servers 380, 382, 384, and 386). If the signatures are the same, then the local image will be loaded and executed (thus providing the shorter boot time). If the signatures do not match (meaning different images exist on processor system 310 and remote storage contained within or accessible by session servers 380, 382, 384, and 386), the user will be notified and may be allowed to determine whether to load the new image or boot with the existing image. Such a decision will depend, in part, on policy defined by the central policy manager—if the user is not allowed by policy to decide, then the image from remote storage contained within or accessible by session servers 380, 382, 384, and 386 is automatically downloaded to user machine 310 and booted. In a similar fashion, dynamic Linux thin client X 314 and dynamic thick client Z 316 will be loaded from the associated cached VM appliance images 342 and 346 if the signatures on those VM appliances match the signatures from the remote storage contained within or accessible by session servers 380, 382, 384, and 386.

In an embodiment, the cached versions of VM appliances 340-346 can be encrypted to prevent access of domain specific information from unauthenticated entities. Central policy manager within authentication management server 390 can provide the necessary decryption keys once the user has been successfully authenticated and logged into processor system 310. Only then could the encrypted versions of cached VM appliances 340-346 be decrypted and loaded.

In another embodiment VM appliances 340-346 may be stored remotely from virtual machine environment 360, including, by way of example and not limitation, on an external memory device. Such external memory device could include a memory stick or Universal Serial Bus (USB) drive. This could occur as a result of a policy environment where cached images are prohibited.

A second advantage of storing local images of the processing instantiations (e.g., thin clients) is that no residual data is retained between a terminated user connection and any other connections made with that end user workstation. For example, in FIG. 3, a user of end user workstation 309 may establish a connection (or session) with domain X 352. During interactions with domain X 352, the user may create or modify data and may want to store that data. In an embodiment, that data can be securely stored in domain X 352 on various servers. Upon the termination of that session, all sensitive information from that session can be purged from virtual machine environment 360 but retained on the various servers in domain X 352, thereby protecting any sensitive or classified information that was utilized for such connection from compromise as a result of any other person using end user workstation 309. A corresponding advantage to this approach is that all data needed by the user is, effectively, portable (i.e., the user can access it from any location and from any compatible device).

Agent 330 contains stored credentials W 332, X 334, Y 336 and Z 338 that can be used in an embodiment for providing single sign on (SSO) capability for the user as more fully described in certain parts of the flow charts shown in FIG. 9 to FIG. 12. In particular, agent 330 and stored credentials 332-338 allow the user of processor system 310 to utilize a single network login and a security mechanism (including, for example, a card reader, fingerprint reader, keyboard entry mechanism, or any other identity reader) to retrieve authentication data from individual holders of the identity providers. This can be used to create a single authentication token that can be leveraged into multiple environments from a single multiple domain workstation. Such a multi-part authentication token would contain identity information for each domain and would encrypt the information with a domain specific key. The various information (including, for example, identity information) specific for that domain would then only be accessible within the appropriate domain.

Figure 4:
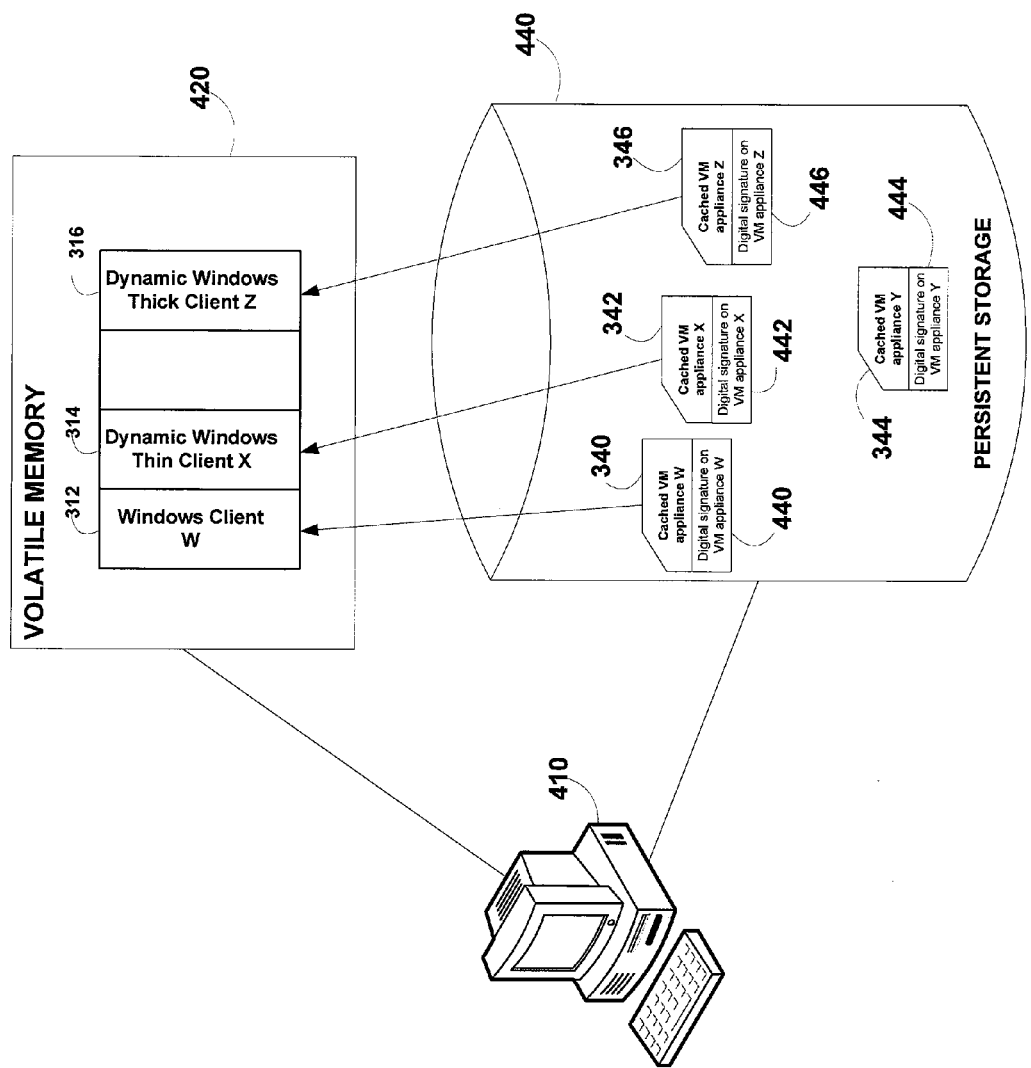
FIG. 4 illustrates an example of a logical arrangement between the volatile and persistent memory in an end user workstation that provides dynamic communities of interest.

FIG. 4 depicts a logical relationship between the hardware and software on a work station such as end user workstation 309 shown in FIG. 3. In particular, FIG. 4 illustrates how each of the cached VM appliance images can have associated with it a signature, where signature can include any mechanism to assure the integrity or authenticity of the data comprising the VM appliance image. This could include, by way of example and not limitation, a checksum, electronic signature, or digital signature. In an embodiment, the signature used to check the cached images can be a cryptographic digital signature based on public key cryptography. A digital signature can be calculated across any data object using a variety of cryptographic techniques, including the calculation of a one-way cryptographic hash value across the data to be digitally signed and the calculation of the digital signature itself, such as digital signatures 440, 442, 444, and 446 shown in FIG. 4.

A digital signature derives its security from the concept of a key pair, consisting of a public key and private key that are mathematically related. Within a public key infrastructure (PKI), a Certification Authority (CA) can provide key pairs to users (where users may be persons or computing devices). In a PKI, a public key of a user can be shared publicly without jeopardizing overall security. More specifically, the mathematical relationship between the public key and the private key that comprise the key pair permit a user of the key pair to reveal the public key such that others within the PKI may use the public key but any entity that obtains the user's public key cannot compromise the system. This characteristic is particularly important in an open network system such as the Internet where parties that are unknown to each other need a reliable means of authenticating each other. The private key, on the other hand, must be securely maintained in order for the security of the system to be maintained.

A public key pair used to produce a public key digital signature further has the property of computational infeasibility; i.e., it would be computationally infeasible for an entity to determine the private key of a user from the public key of that user. Thus, the user may share the public key of the user's key pair through a mechanism known as a digital certificate (or simply a "certificate"). In addition to the public key, a certificate may contain a number of other fields that contain information about the user or about the CA that issued the certificate. The well understood X.509 standard, ITU recommendation ITU-T X.509, defines a certificate format commonly used for Internet communications.

The mathematical relationship between the private key that produces the digital signature and the public key that verifies the digital signature provides several important security services. First, authentication provides the assurance to the person receiving and verifying the digital signature (e.g., the system administrator responsible for the cached virtual machine images) that the digital signature was in fact produced by someone (e.g., the author of the virtual machine being used) who had access to the private key associated with the public key that was used to verify that digital signature.

The second security service provided via the use of digital signatures is known as data integrity. This security service provides the assurance that the message (e.g., the virtual machine) that was created by the signer of the message has not been changed in the course of its transmission to the receiver of that message. Operationally, the assurance of data integrity comes from the mathematical processes used to produce and verify the digital signature. As discussed above, one portion of the digital signature process consists of calculating a hash result or hash value from a one way hashing function. The one way hashing function is applied to every portion of the data object that is going to be signed by the signer. The hashing function produces a unique value for each data object that is then used as the input to the actual production of the digital signature. The hash value thus produced ensures that if any bit in the message or data object that is being digitally signed is changed, the verification of the digital signature will fail. In an embodiment, a hash value can be calculated across the binary image of each VM appliance 340, 342, 344, and 346.

The third security service offered by the use of digital signatures is known as nonrepudiation. Nonrepudiation refers to the assurance to the recipient of a digitally signed message that evidence exists that would make it extremely difficult for the signer of that message to later deny having created that message. Thus, the service of nonrepudiation offered by digital signatures is an evidentiary assurance. In the context of the cached images of the virtual machines, this would provide assurance to the user that the author of the virtual machine could not, at a later time, deny having created or distributed that virtual machine.

In an embodiment, the private key can remain with the entity that created the digital signature applied to the cached image of the virtual machine. The public key could be shared with any entity that needed to validate the cached image. For example, a system administrator would be able to confirm that the proper cached image had been received, without alteration, by checking the digital signature on the virtual machine upon receipt. Similarly, the system could be architected in such a way that the digital signature on the virtual machine image would be checked each time that the virtual machine is loaded into end processor system 310.

Figure 5:
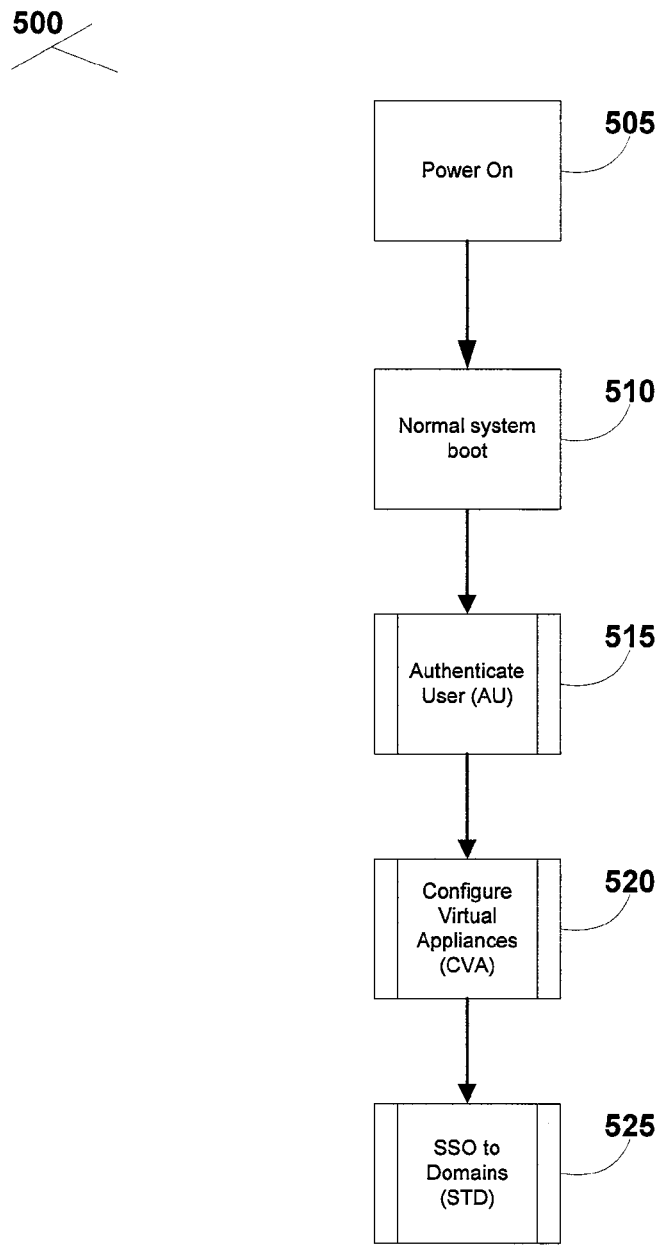
FIG. 5 is a flow chart that depicts a high level process of initializing an end user workstation that provides dynamic communities of interest.

FIG. 5 is a flow chart that depicts a high level process that could be used to initialize a workstation according to the present invention, including, for example, end user workstation 309 shown in FIG. 3. In an operation 505, an end user workstation can be initiated via a power-on sequence and could execute a normal system boot process in an operation 510. The normal system boot process could include various hardware and firmware initialization, along with various other security checks, such as validations that the boot image is correct and that the hardware configuration has not been tampered with.

In an operation 515, the end user can be authenticated. In this instance, authentication means that the end user provides enough information that can then be verified by authentication management server 390, which will then allow the user to access one or more secure domains. In an embodiment, authentication management server can utilize a multi-domain Lightweight Directory Access Protocol (LDAP) server 392 for assistance in making authentication decisions. As is well known, an LDAP server provides the ability to look up entries in a number of different ways. A multi-domain LDAP server 392 can provide the ability to access authentication information over multiple security domains that can be directly attached to the multi-domain LDAP server 392. The multi-domain capabilities of multi-domain LDAP server 392 ensure that each of the domains can not be read or written to by each other and that the authentication server 390 will only be able to read the authentication data and not write data into the data portion of multi-domain LDAP server 392.

In certain scenarios, there may be a desire to have a collaborative domain that would be shared by multiple entities, the end users of which would all need to be authenticated. For example, the militaries of the United States and Korea may desire a common domain for sharing of tactical information. Further, such common domain may have varying security and clearance requirements. Referring back to FIG. 3, domain W 350 could be used as the shared domain. While domain W 350 could be used to store information from both countries, the two countries may not want to share authentication information. In such a case, other discrete and dedicated domains could be used. For example, domain X 352 could be used by the United States military to store its authentication information and domain Z 356 could be used by the Korean military to store its authentication information. In such a case, a multiple domain, multi-level security LDAP server could be implemented as discussed above. Multi-domain LDAP server 392 can access (and, when the system has the potential to be deployed into a tactical environment, possibly store locally) the authentication information stored in domain X 352 and domain Z 356. This information from multi-domain LDAP server 392 can then be used by authentication management server 390 to determine whether or not a particular person has presented enough information to be properly authenticated.

Once the user has been authenticated, the virtual appliances corresponding to the secure domains to which the user is seeking access can be configured in an operation 520. Finally, a single-sign-on (SSO) process can be run in an operation 525 that will permit the user to access those secure domains to which it is seeking access. Each of these operations can be implemented in a variety of ways, including via the processes discussed in relation to FIG. 6 through FIG. 12 below.

Figure 6:
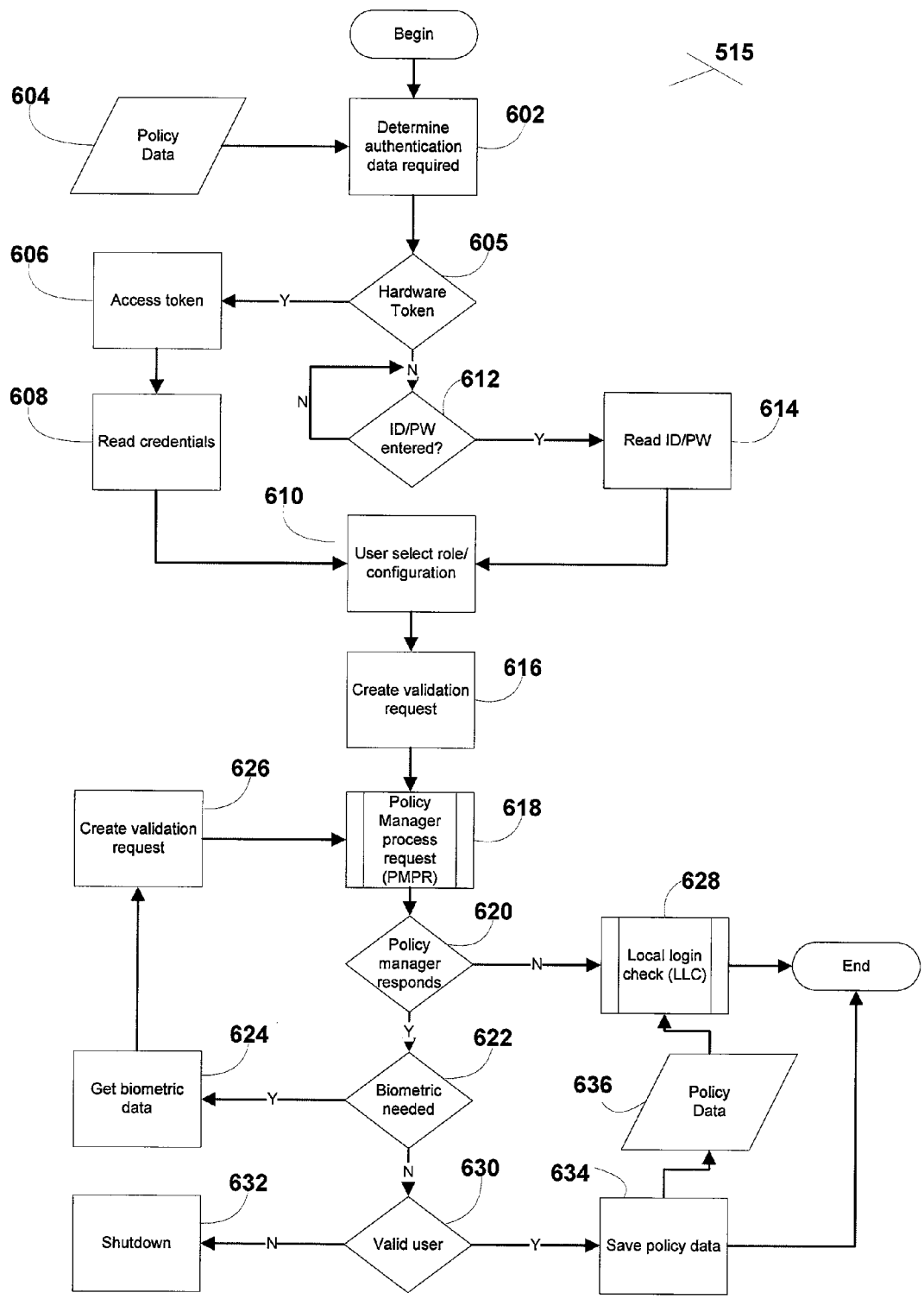
FIG. 6 is a flow chart that depicts a user authentication process.

In FIG. 6, the user authentication process 515 can begin with a determination of the authentication data actually needed to authenticate the user. An important component of this determination can include policy data 604. This could include, for example, policy requirements related to sensitivity of data or clearance level of the user. As another example, policy data 604 could also include restrictions related to the information that may or may not be accessible to members of various coalition entities that are communicating via a particular domain. In yet another example, policy data could include information about which processing instantiations are permitted on particular workstations and whether certain processing instantiations are prohibited on other workstations. In a specific scenario, a person could have clearance up to a particular level (e.g., top secret), but that person may be attempting to authenticate on a workstation that is in an area that is only classified up to the secret level. By policy, that workstation could be prohibited from receiving a top secret processing instantiation (even though the person has the proper clearance).

In an operation 605, a determination can be made of whether a hardware token is present. If so, the hardware token can be accessed in an operation 606 and the credentials can be read from the hardware token in an operation 608. In the event that a hardware token is not present or is not required by policy (as determined in operation 605 from policy data 604), the system can enter a loop waiting for the entry of a user ID and password in an operation 612. Upon entry of such a pair, the user ID and password can be read in an operation 614. Next, where either a hardware token or username/password are in use, the user can select the desired role and/or configuration in an operation 610. For example, a user responsible for approving purchases may select a role as purchasing officer or may select a configuration of a particular set of processing instantiations. In general, the selection of a role or a configuration by a user will result in a dynamic configuration of the workstation based on policy data 604, since policy data 604 contains the intersection of information about the user, the role of that user, the configuration, and the workstation on which the user is attempting to authenticate.

Once the user has selected one or more roles and/or configurations, a validation request for that user can be created in an operation 616. The validation request can be used by a policy manager to determine whether to permit or deny access by the user to resources being requested by the user, or if additional information about the user is needed in order to make such a decision. To make such a determination, a Policy Manager Process Request can be launched in an operation 618. If the policy manager responds, as determined in an operation 620, the response may include a requirement for further identification data to be submitted from the user. This could include, for example, a second identity factor (such as a biometric). Such a requirement can be determined in an operation 622, which, in an embodiment, can check whether biometric data is needed. If so, further biometric data can be collected in an operation 624 and a follow up validation request can be created for the policy manager in an operation 626. This can then result in a subsequent Policy Manager Process Request that can be launched in an operation 618.

If a biometric is not needed as a result of the determination in operation 622, a determination can be made in an operation 630 of whether the user is a valid user based on the credentials supplied by the user (either biometric or username/password). If the user cannot be validated, as determined in an operation 630, the workstation can be shut down in an operation 632. If the user can be validated, relevant policy data can be saved in operation 634 and a local login check can be commenced in an operation 628. In the event that a response is not received from the policy manager in operation 620, a local login check can still be commenced in an operation 628 based on policy data 604.

Figure 7:
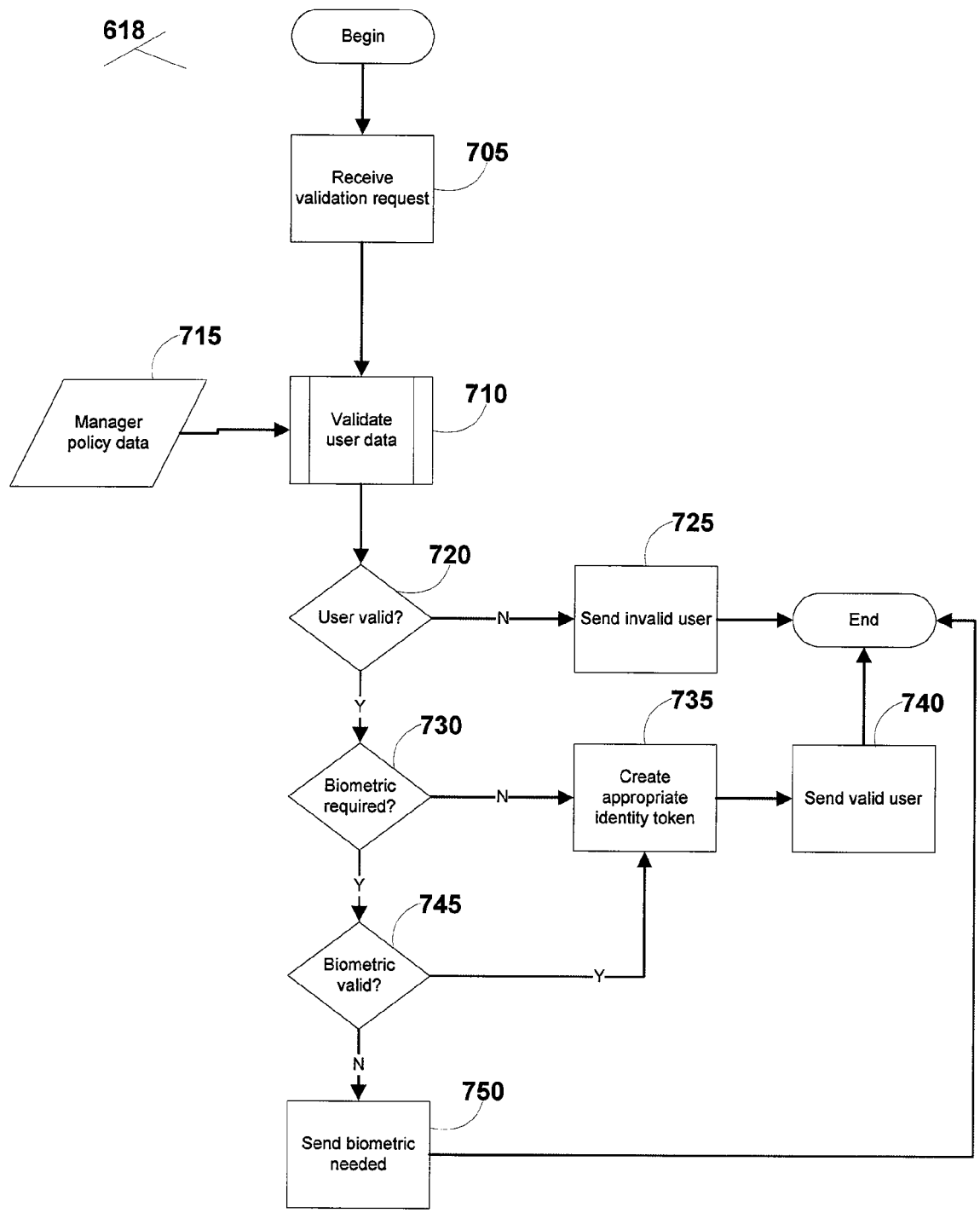
FIG. 7 is a flow chart that depicts a policy manager process request.

FIG. 7 depicts an example of a sequence that can be used to implement policy manager process request 618. Such a sequence could be executed by a policy manager function contained within authentication management server 390. In an operation 705 a validation request can be received from the end user workstation. In an operation 710 the data received from the user can be validated against manager policy data 715. In an operation 720, a determination can be made whether the user is valid. If not, an 'invalid user' message can be sent to the end user workstation in an operation 725.

If the user is determined to be valid, processing continues in an operation 730 where a determination is made as to whether policy requires that a biometric authentication be performed on the user. If so, the data received from the user as part of the validation request can be examined in an operation 745 to determine if a valid biometric has been provided in a message from agent 330 on the end user workstation to be validated by authentication management server 390. If policy requires a biometric authentication as determined in operation 730 but the data provided by the user as part of the validation request does not contain valid biometric data, a 'biometric needed' message can be sent in an operation 750.

If a user is determined to be valid in operation 720 but either (a) no biometric is needed as determined in operation 730 (e.g., in the case where policy only dictates the need for a username and password) or (b) a valid biometric is determined to have been provided by the user as a result of the check in operation 745, processing can continue in an operation 735, where an identity token that is appropriate for the particular user request can be created. The identity token will have components for each of the allowable domains that have been requested by the user and approved by the policy manager. Once the appropriate identity token has been created in operation 735, a 'valid user' message can be sent in an operation 740 and the identity token can be provided back to agent 330.

Figure 8:
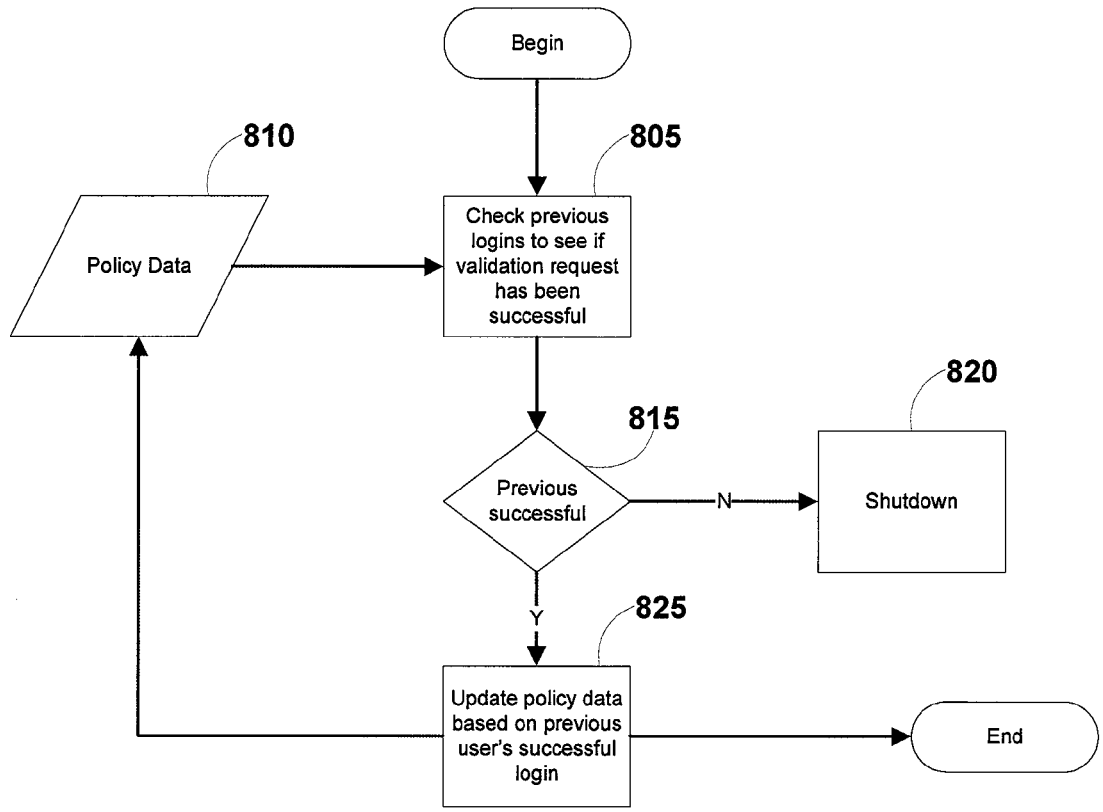
FIG. 8 is a flow chart that depicts a local login check process.

FIG. 8 depicts an example of a sequence that can be used to implement local login check process 628. Such a sequence could be executed agent 330 shown in FIG. 3 (if permitted by policy). In an operation 805, a check can be performed to determine whether validation requests performed during prior logins have been successful. Such a determination will, in part, depend on policy data 810.

In the event that a previous login for a particular user has been successful, policy data 810 can be updated in an operation 820 and the user can be allowed to login successfully. In the event, however, that a previous login for that user has not been successful, the current user is deemed not to be trusted and so the system is shut down in an operation 820. This approach can be used where multiple users will be using the same end user workstation at different times, and the end user workstation can keep track of those users.

Figure 9:
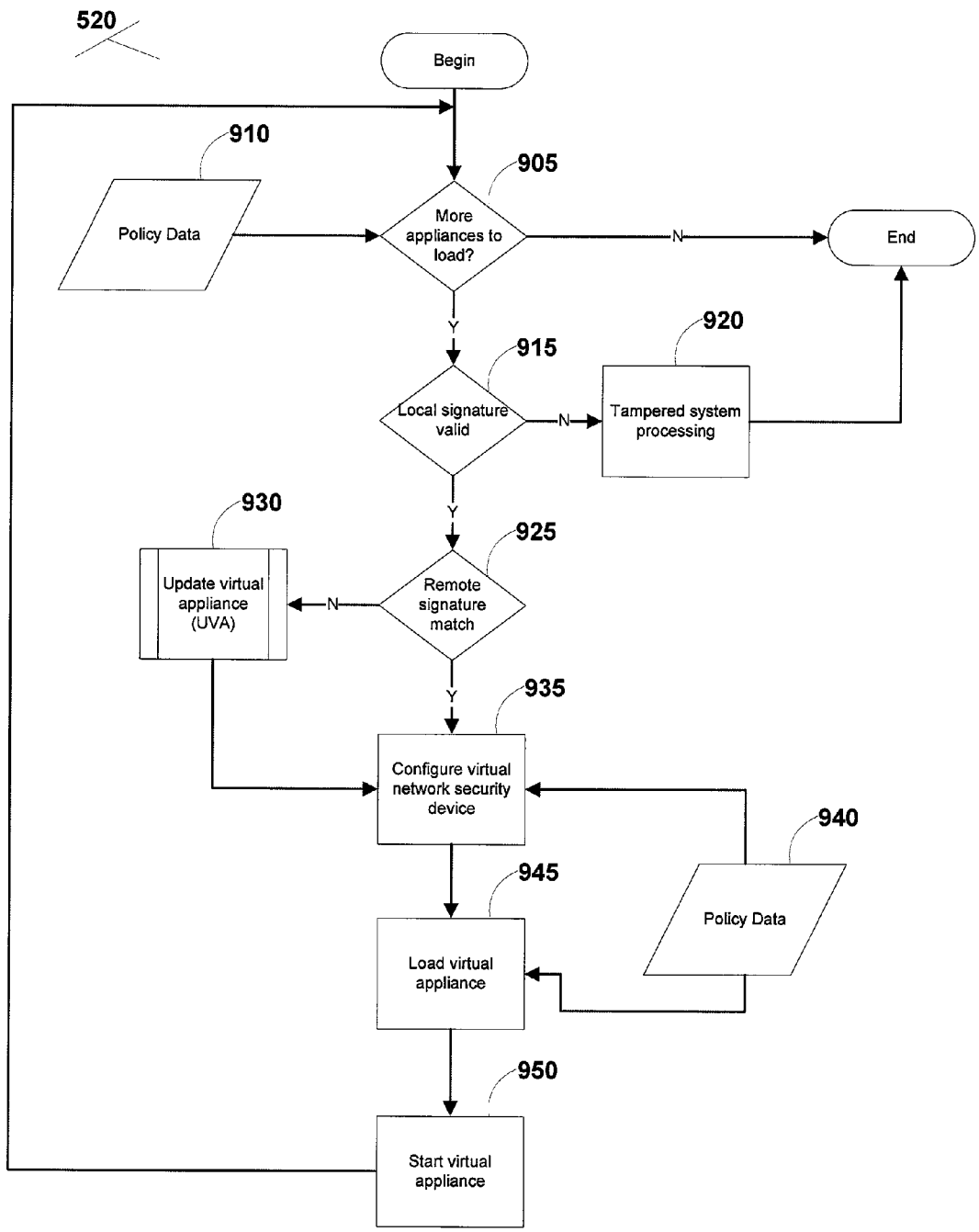
FIG. 9 is a flow chart that depicts the process of configuring a virtual appliance for a user that has successfully logged into an end user workstation in a dynamic community of interest.

FIG. 9 is a flowchart that depicts the process that can occur in configuring virtual appliances for a user that has successfully logged into an end user workstation in a dynamic community of interest. In an operation 905, a determination can be made of whether there are more virtual appliances to load based on policy data 910. If no more virtual appliances need to be loaded, processing finishes and control is returned to the overall process 500 shown in FIG. 5.

If more virtual appliances are to be loaded, a local signature can be checked for validity in an operation 915. This local signature can be a digital signature that has been associated with the electronic image of the virtual appliance being checked. If the signature is not valid, it can indicate that data representing the virtual appliance image has been corrupted (including, for example, by someone tampering with the system. In such an instance, an indication can be provided in an operation 920 that system processing has been tampered with and that image can be marked to be removed.

If the local signature is valid, a determination can be made in an operation 925 of whether the embedded image signature matches a remote signature on the same virtual appliance. In the case where the embedded image signature does not match the remote signature, a process can be performed in an operation 930 to update that virtual appliance on the end user workstation. This could occur, for example, where an update has been made to the virtual appliance. If the local signature does match the remote signature, a virtual network security device can be configured in an operation 935 using policy data 940. Policy data in this instance can include security parameters for communication with the associated sessions servers 380-386 shown in FIG. 3.

Once the virtual network security device has been configured, the virtual appliance can actually be loaded on the physical end user workstation in an operation 945. This will also entail usage of policy data 940, which can include communication rules and security parameters. Once the virtual appliance has been loaded on the end user workstation, the virtual appliance can be started in an operation 950.

Figure 10:
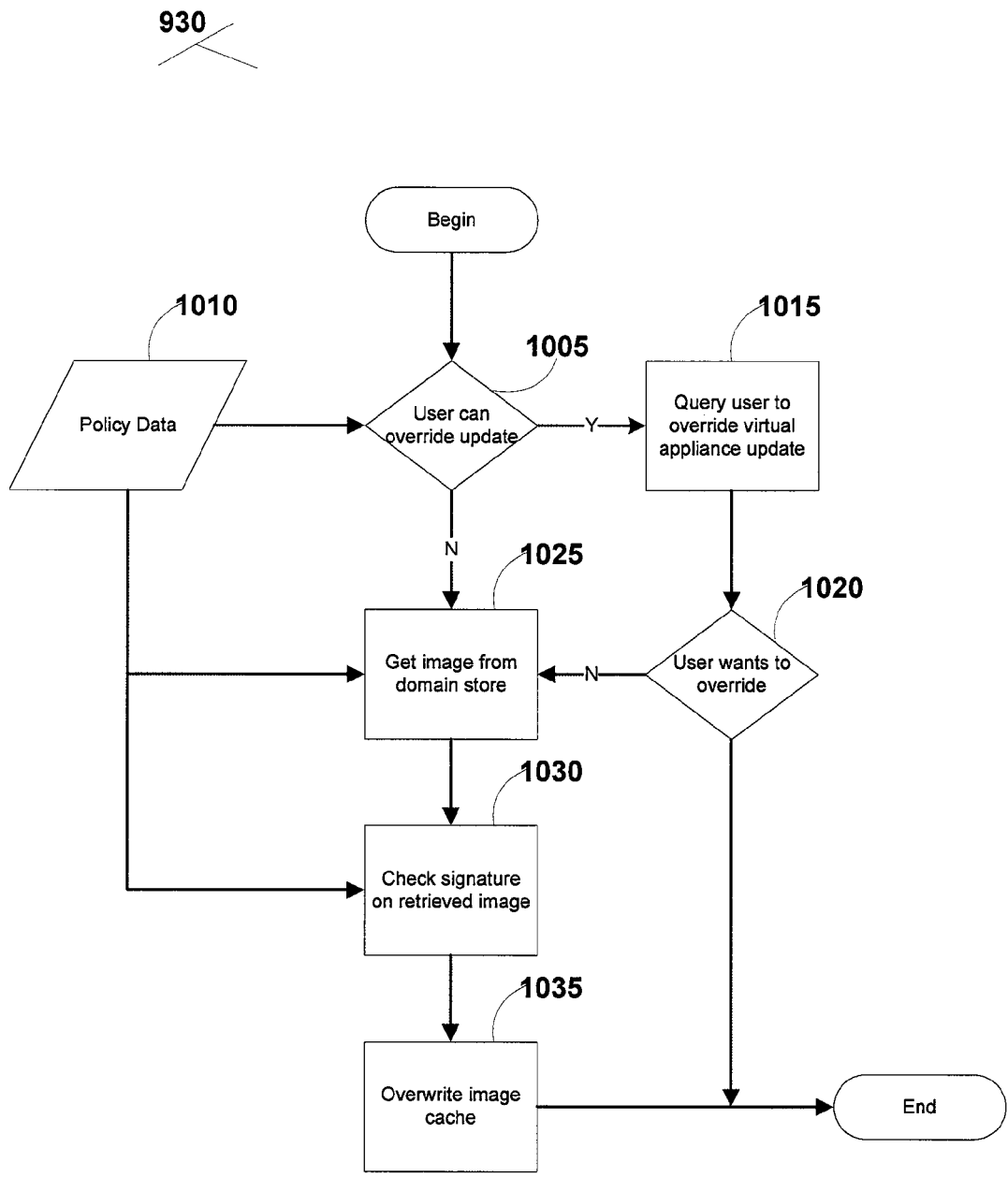
FIG. 10 is a flow chart that depicts the process for updating a virtual appliance for an end user workstation in a dynamic community of interest.

FIG. 10 is a flowchart that depicts the process 930 that can occur when updating a virtual appliance for an end user workstation in a dynamic community of interest. In an operation 1005, a determination can be made of whether a user can override the updating of the virtual appliance based on policy data 1010. If the policy for the user's community of interest permits the update process to be overridden, the user can be prompted in an operation 1015 of whether to override the update process. In an operation 1020, a determination can be made of whether the user would like to override the update process. If so, the update process terminates.

If, by policy, the user may not override the update process or if the user decides not to override the update process, an updated virtual appliance image can be retrieved in an operation 1025 from a storage facility within the domain associated with the virtual appliance being updated. In an operation 1030, one or more electronic signatures on the virtual appliance image can be checked (where any of such electronic signatures could include a digital signature). As a first check, a local electronic signature on the image itself can be checked to determine whether the image has been modified or replaced in an unauthorized fashion. As a second check, an electronic signature contained within the virtual appliance image can be checked against a signature value contained within the applicable domain store. Once all signature checks have passed, the local image cache can be overwritten with the updated virtual appliance in an operation 1035.

Figure 11:
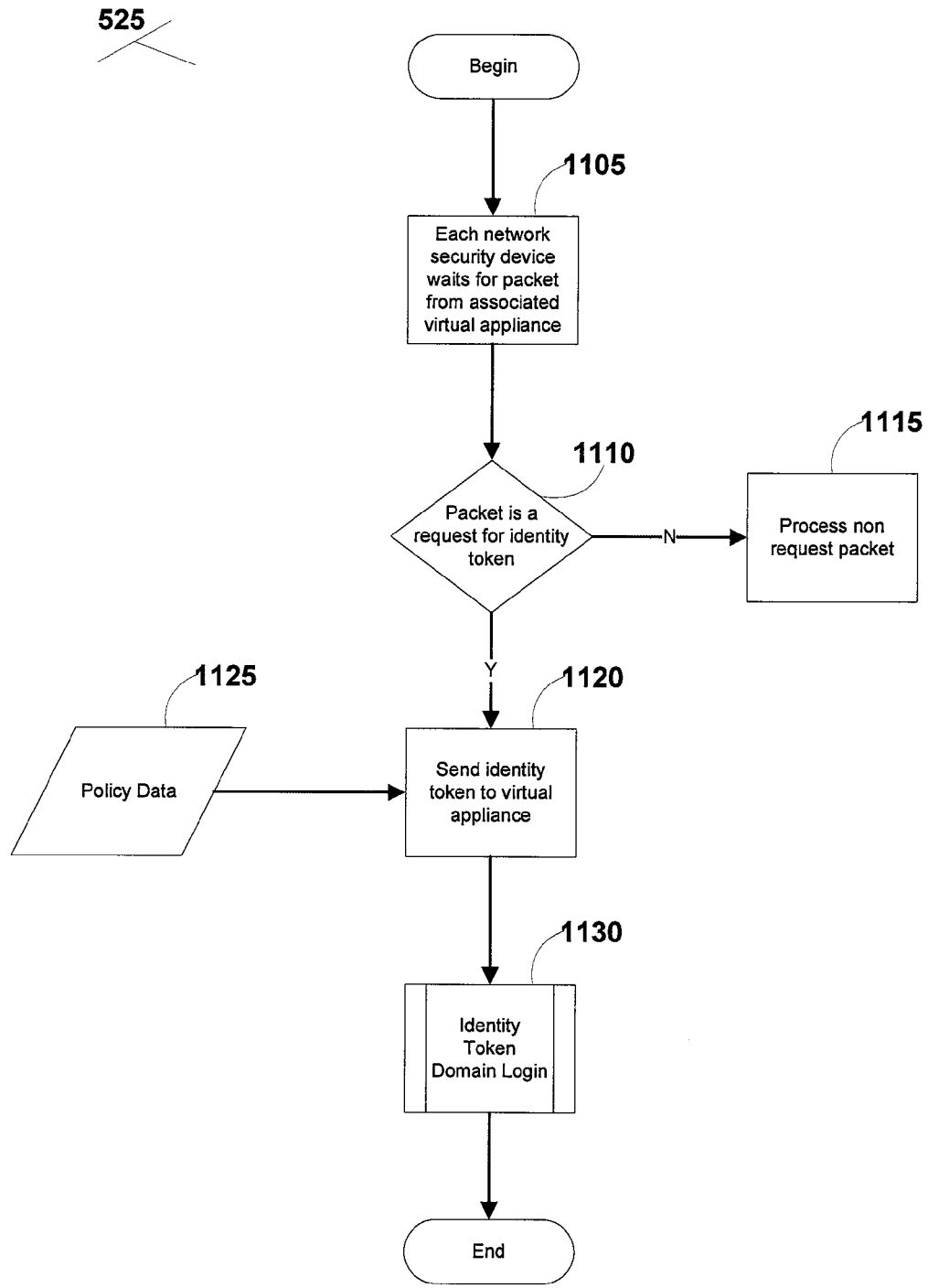
FIG. 11 is a flow chart that depicts when an end user performs a single sign on (SSO) process to one or more domains in a dynamic community of interest.

FIG. 11 is a flowchart that depicts the process 525 that can occur when an end user performs a single sign on (SSO) process to one or more domains in a dynamic community of interest. In an operation 1105, each network security device polls for receipt of a request packet from an associated virtual appliance. In an operation 1110, each received packet can be evaluated to determine whether it is a request for an identity token. If it is not, it can be processed as required in an operation 1115. If the received packet is a request for an identity token, the identity token can be sent to the virtual appliance in an operation 1120, based on policy data 1125. Upon receipt of that identity token, the user can be logged in via an identity token domain login process 1130 as described further in the context of FIG. 12.

Figure 12:
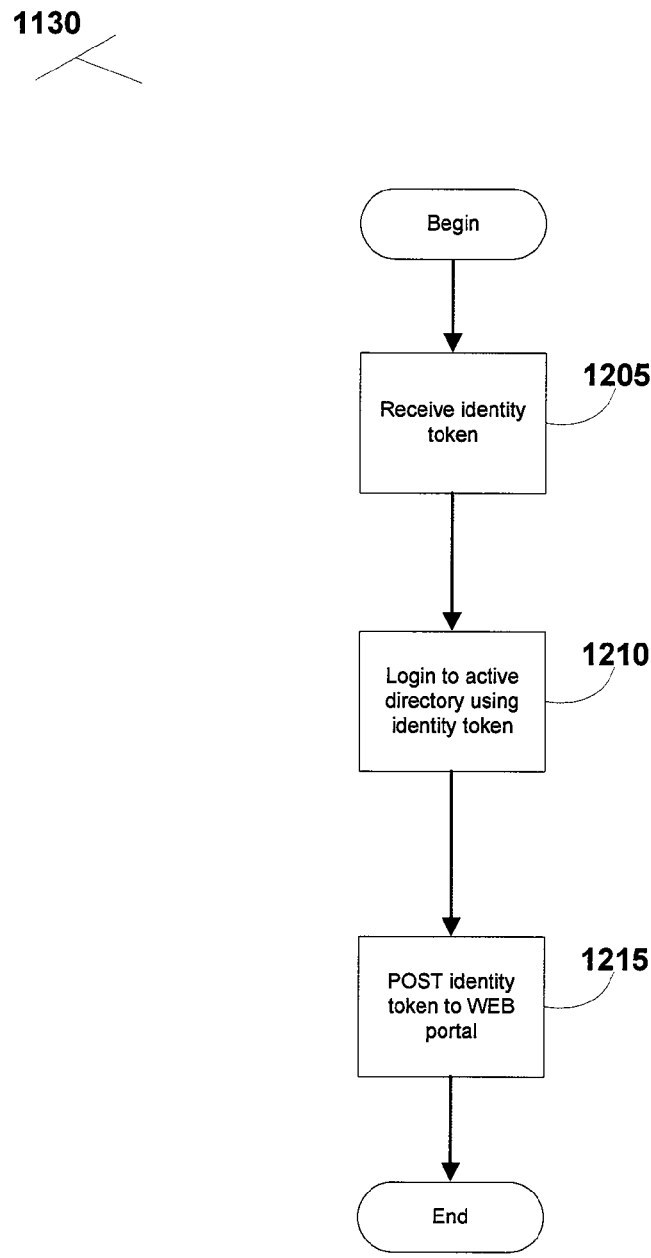
FIG. 12 is a flow chart that depicts performing an identity token domain login process.

FIG. 12 is a flowchart that depicts the process 1130 that can be used to perform an identity token domain login process, which can be used to facilitate an end user single sign on (SSO) process to one or more domains in a dynamic community of interest. In an operation 1205, an identity token can be received. As a result of the receipt of the identity token, a login can be performed to the active directory within the requested domain in an operation 1210. Once logged in, an identity token representing the entity that has logged in can be posted to a web portal in an operation 1215, which can be used to provide web services to the end user workstation.

The various logical blocks and algorithm steps described herein may be implemented as hardware, software, or combinations of both. Whether such functionality is implemented as hardware or software depends upon the particular application and design constraints imposed on the overall system. The described functionality may be implement in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

Methods described in connection with the embodiments disclosed herein may be embodied directly in hardware, in a software module executed by a processor, or in a combination of the two. A software module could reside in any form of storage medium known in the art, including, without limitation, RAM, ROM, or flash memory, a CD-ROM, a removable disk, or. In the alternative, the storage medium may be integral to the processor. The processor and the storage medium may reside in an ASIC. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A workstation that dynamically provides an authorized user logged in through an authentication server with access to a plurality of security domains over a network, each of the security domains providing the authorized user access to secure information associated with each of the respective security domains, the workstation comprising:
   a storage component that protectively stores a plurality of virtual machine appliances local to the workstation, each of the plurality of virtual machine appliances operatively configured to provide secured access to the secure information associated with at least one of the plurality of security domains over the network; and
   a virtual machine environment, operative on the workstation, that executes any one or more of the plurality of virtual machine appliances stored local to the workstation, wherein the virtual machine environment further comprises:
      an authentication component operative within the virtual machine environment that provides the user with a single sign on, and that receives a role associated the user, each role having a description that specifies a level of access the user has to one or more of the plurality of security domains,
      a monitoring component operative within the virtual machine environment that monitors changes to the role or its description, and
      an instantiating component operative with the virtual machine environment that instantiates a virtual machine on the workstation within the virtual machine environment for each of at least a first plurality of the plurality of the virtual machine appliances based on the role of the user, and that, based on changes to the role, dynamically instantiates another virtual machine on the workstation within the virtual machine environment and/or removes at least one of the instantiated virtual machines from the workstation within the virtual machine environment while the user is logged in,
      whereby the virtual machine environment dynamically controls access of the user to the plurality of security domains.

2. The workstation of claim 1, wherein the virtual machine environment comprises a kernel operating system.

3. The workstation of claim 1, wherein the one or more virtual machine appliances are cached within the virtual machine environment.

4. The workstation of claim 3, wherein the one or more cached virtual machine appliances are encrypted.

5. The workstation of claim 3, wherein the one or more cached virtual machine appliances further comprise a virtual private network.

6. The workstation of claim 1, wherein the one or more virtual machine appliances are stored remotely from the virtual machine environment.

7. The workstation of claim 6, wherein the one or more virtual machine appliances are encrypted.

8. The workstation of claim 7, wherein the one or more virtual machine appliances further comprise a virtual private network.

9. The workstation of claim 1, further comprising a virtual network security device.

10. The workstation of claim 1, wherein the one or more virtual machine appliances are configured based upon policy data.

11. The workstation of claim 10, wherein the policy data includes an identity of the end user.

12. The workstation of claim 10, wherein the policy data includes a role of the end user.

13. The workstation of claim 10, wherein the policy data includes information on an end user workstation being used by the end user.

14. The workstation of claim 10, wherein the policy data is maintained on a centralized server.

15. A method for authenticating a user of an end user workstation accessing one or more communities of interest over a network, comprising:
   determining, by a workstation, authentication data required for the user to access one or more of the communities of interest over the network;
   receiving, by the workstation, authentication data from the user;
   creating, by the workstation, a validation request;
   transmitting, by the workstation, the validation request to an authentication management server;

providing, by the authentication management server, access to authentication information from the one or more communities of interest;

accessing, by the authentication management server, a multi-domain Lightweight Directory Access Protocol (LDAP) server for authentication information;

receiving, by the workstation, a response from the authentication management server;

determining, by the workstation, if the user is a valid user; and if the user is determined to be a valid user, authorizing the user workstation to execute a virtual machine locally stored on the workstation, the virtual machine being associated with the one or more communities of interest.

16. The method of claim 15 further comprising:
determining if biometric data from the user is needed; and
receiving biometric data from the user.

17. The method of claim 15 further comprising performing a local login check.

18. The method of claim 15 further comprising receiving a role indication from a user.

19. The method of claim 15 further comprising:
allowing the authentication management server to read authentication data from the multi-domain LDAP server; and
preventing the authentication management server from writing authentication data to the multi-domain LDAP server.

20. A method for dynamically providing an authorized user logged in through an authentication server with access to a plurality of security domains over a network, each of the security domains providing the authorized user access to secure information associated with each of the respective security domains, the method comprising:

receiving, by a workstation, authentication information from a user via a single sign on, the authentication information authenticating the user by logging the user in through the authentication server;

receiving, by the workstation, a role associated with the authenticated user;

retrieving, by the workstation, based on the received role, a plurality of virtual machine appliances stored local to the workstation, each of the plurality of virtual machine appliances stored local to the workstation and associated with one of the plurality of security domains to which the user has access;

instantiating, by the workstation, a plurality of virtual machines in a virtual machine environment, each of the plurality of virtual machines corresponding to one of the plurality of retrieved virtual machine appliances, the virtual machine environment providing secured access to the secure information associated with each of the plurality of security domains via a corresponding one of the plurality of instantiated virtual machines;

receiving, by the workstation, a change to the role of the user; and in response to and based on the received change and without further sign on, instantiating another virtual machine within the virtual machine environment thereby providing the user with access to another security domain or removing at least one of the instantiated virtual machines within the virtual machine environment thereby excluding the user from access to at least one of the plurality of security domains.

21. The method of claim 20, the role further having a description that specifies a level of access the user has to each of the plurality of security domains.

22. The workstation of claim 1, wherein the plurality of virtual machine appliances includes a first virtual machine and a second virtual machine that are different from each other.

23. The workstation of claim 22, wherein the first virtual machine is a Windows virtual machine and the second virtual machine is a Linux virtual machine.

* * * * *